US008705096B2

(12) United States Patent
Ikeda

(10) Patent No.: US 8,705,096 B2
(45) Date of Patent: Apr. 22, 2014

(54) IMAGE FORMING APPARATUS AND DISPLAY METHOD FOR DISPLAYING DIFFERENT COMPONENT INFORMATION BASED ON A TYPE OF USER OF THE IMAGE FORMING APPARATUS

(75) Inventor: Takemasa Ikeda, Hachioji (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 384 days.

(21) Appl. No.: 13/079,140

(22) Filed: Apr. 4, 2011

(65) Prior Publication Data

US 2011/0242602 A1 Oct. 6, 2011

(30) Foreign Application Priority Data

Apr. 5, 2010 (JP) ................................ 2010-086625

(51) Int. Cl.
*G06F 3/12* (2006.01)

(52) U.S. Cl.
USPC ......... 358/1.15; 358/1.13; 358/1.14; 358/1.6; 358/1.9; 358/475; 399/12; 399/81; 399/24; 399/75; 399/79; 715/271

(58) Field of Classification Search
CPC . G03G 15/55; G03G 15/553; G03G 15/5016; H04N 1/00002; H04N 1/00053; H04N 1/0005; B41J 29/393; B41J 29/17546; B41J 29/17566; B41J 29/38
USPC ................ 358/1.15, 1.13, 1.14, 1.6, 1.9, 475; 399/12, 27, 24, 75, 79, 8, 81; 715/271
See application file for complete search history.

(56) References Cited

U.S. PATENT DOCUMENTS

2004/0234281 A1* 11/2004 Yoshida et al. ................ 399/24
2009/0097061 A1* 4/2009 Kaneko ........................ 358/1.15

FOREIGN PATENT DOCUMENTS

JP 2009-069638 A 4/2009
JP 2009-169003 A 7/2009

OTHER PUBLICATIONS

Japanese Office Action dated Jul. 23, 2013 (and English translation thereof) in counterpart Japanese Application No. 2010-086625.
Chinese Office Action dated Jul. 25, 2013 (and English translation thereof) in counterpart Chinese Application No. 201110087382.2.

* cited by examiner

*Primary Examiner* — Jacky X Zheng
(74) *Attorney, Agent, or Firm* — Holtz, Holtz, Goodman & Chick, PC

(57) ABSTRACT

Disclosed is an image forming apparatus including a plurality of components, a display section to display information of the components, a storage section to store replacing person information of the components and a control section to make the information of the components which are displayed in the display section be different according to the replacing person information of the components.

12 Claims, 11 Drawing Sheets

*FIG.5*

| No. | COMPONENT NAME | USER REPLACEABLE COMPONENT OPTION | NUMBER OF INCLUDING COMPONENT | LIFE COUNTER VALUE (%) |
|---|---|---|---|---|
| 001 | TONER COLLECTING BOX | REPLACEABLE | – | 80 |
| 002 | FEEDING/ SEPARATION RUBBER | NOT-REPLACEABLE | – | 3 |
| 003 | FEEDING/ SEPARATION RUBBER | NOT-REPLACEABLE | – | 1 |
| 004 | FIXATION UNIT | REPLACEABLE | ◎ | 150 |
| 005 | EXTERNAL HEATER FOR FIXATION | – | 004 | 30 |
| 006 | FIXATION ROLLER | – | 004 | 20 |
| 007 | FIXATION HEATER | – | 004 | 150 |

FIG. 7

| No. | COMPONENT NAME | USER REPLACEABLE COMPONENT OPTION | NUMBER OF INCLUDING COMPONENT | LIFE COUNTER VALUE (%) |
|---|---|---|---|---|
| 001 | TONER COLLECTING BOX | REPLACEABLE | – | 80 |
| 002 | FEEDING/ SEPARATION RUBBER | NOT-REPLACEABLE | – | 3 |
| 003 | FEEDING/ SEPARATION RUBBER | NOT-REPLACEABLE | – | 1 |
| 004 | FIXATION UNIT | NOT-REPLACEABLE | ◎ | 150 |
| 005 | EXTERNAL HEATER FOR FIXATION | – | 004 | 30 |
| 006 | FIXATION ROLLER | – | 004 | 20 |
| 007 | FIXATION HEATER | – | 004 | 150 |

FIG.9

| No. | COMPONENT NAME | USER REPLACEABLE COMPONENT OPTION | NUMBER OF INCLUDING COMPONENT | LIFE COUNTER VALUE (%) |
|---|---|---|---|---|
| 001 | TONER COLLECTING BOX | REPLACEABLE | – | 120 |
| 002 | FEEDING/ SEPARATION RUBBER | NOT-REPLACEABLE | – | 3 |
| 003 | FEEDING/ SEPARATION RUBBER | NOT-REPLACEABLE | – | 1 |
| 004 | FIXATION UNIT | REPLACEABLE | ◎ | 80 |
| 005 | EXTERNAL HEATER FOR FIXATION | – | 004 | 30 |
| 006 | FIXATION ROLLER | – | 004 | 20 |
| 007 | FIXATION HEATER | – | 004 | 80 |

FIG.12

G10

| LIFE COUNTER VALUE | | |
|---|---|---|
| No. | COMPONENT NAME | LIFE COUNTER VALUE (%) |
| 001 | TONER COLLECTING BOX | 80 |
| 002 | FEEDING/SEPARATION RUBBER | 3 |
| 003 | ADVANCING ROLLER | 1 |
| 004 | FIXATION UNIT | 150 |
| 005 | EXTERNAL HEATER FOR FIXATION | 30 |
| 006 | FIXATION ROLLER | 20 |
| 007 | FIXATION HEATER | 150 |

FIG.13

G20

| LIFE COUNTER VALUE | | |
|---|---|---|
| No. | COMPONENT NAME | LIFE COUNTER VALUE (%) |
| 001 | TONER COLLECTING BOX | 80 |
| 002 | FEEDING/SEPARATION RUBBER | 3 |
| 003 | ADVANCING ROLLER | 1 |
| 004 | FIXATION UNIT | 150 |

IMAGE FORMING APPARATUS AND DISPLAY METHOD FOR DISPLAYING DIFFERENT COMPONENT INFORMATION BASED ON A TYPE OF USER OF THE IMAGE FORMING APPARATUS

BACKGROUND OF THE INVENTION

1. Field of the Invention

The present invention relates to an image forming apparatus and a display method.

2. Description of Related Art

In recent years, for an image forming apparatus which carries out image forming operation by using a plurality of components, the replacement operation of replaceable components among the plurality of components is mainly carried out by a maintenance worker (also called as a customer engineer or a serviceman). As for components which can be replaced relatively easy and safe, there are cases where the replacement operation is to be carried out by a user who uses the image forming apparatus. The components which are replaceable by a user (ORU-M: Operator Replaceable Unit-Management) are being widely used. By using the ORU-M, down time of the apparatus and service costs can be reduced because the components can be replaced by a user.

However, the components which are replaceable by a user are limited and the replacement unit (in terms of each unit/in terms of each component) is defined for each model of image forming apparatuses. Therefore, increase/decrease in the number of replaceable components and the replacement unit thereof cannot be changed according to the usage mode of a user and the places where the image forming apparatus is to be used (country, district). Thus, there is a problem that the services suited for each user cannot be provided.

In view of the above problem, JP 2009-69638 discloses an image forming apparatus including a setting unit which sets the replacement operation method (periodical replacement/replacement at the time of breakdown) whether the component is to be replaced when the component breaks down or is to be replaced periodically for each of the plurality of the replaceable components and which sets the replacing person of each replaceable component, and an information register unit which registers the setting information set by the setting unit.

However, in JP 2009-69638, although the replaceable components which reached their replacement timings can be notified to their replacing persons, the replacement timings of the components which are not replaceable (not-replaceable components) are not notified. Therefore, the not-replaceable components are continued to be used even when their replacement timings are passed. As a consequence, the not-replaceable components are to be replaced when problems such as break down and failure in the not-replaceable components, break down in other components due to the deterioration in the not-replaceable components, deterioration in image quality and the like occur.

Further, the components which are replaceable by a user are often a part of a unit which is constituted by including a plurality of components. Therefore, generally, the components which are replaceable by a user who does not have specialized skills for component replacement operation are to be replaced in terms of each unit in which each of the components is included.

On the other hand, the components which are replaceable by a serviceman who has the specialized skills for component replacement operation are replaced in terms of each component.

In such way, the replacement unit of component is different according to the replacing person (user/serviceman) of each component. Therefore, when notification of information of each component is carried out uniformly, there is a problem that it is difficult for the replacing person to recognize the component which needs to be replaced.

SUMMARY OF THE INVENTION

In view of the above problems, an object of the present invention is to make the information of components be easily recognized according to the replacing person of each component.

To achieve at least one of the abovementioned objects, an image forming apparatus reflecting one aspect of the present invention includes a plurality of components, a display section to display information of the components, a storage section to store replacing person information of the components and a control section to make the information of the components which are displayed in the display section be different according to the replacing person information of the components.

To achieve at least one of the abovementioned objects, a display method for an image forming apparatus comprising a plurality of components and a display section to display information of the components reflecting one aspect of the present invention includes making the information of the components which are displayed in the display section be different according to replacing person information of the components stored in a storage section.

To achieve at least one of the abovementioned objects, an image forming apparatus reflecting one aspect of the present invention includes a plurality of components, a display section to display information of the components, a storage section to store replacing person information of the components and information of units which includes the components and a control section to make the information of the components which are displayed in the display section be different according to the replacing person information of the components and the information of the units which includes the components.

BRIEF DESCRIPTION OF THE DRAWINGS

The present invention will become more fully understood from the detailed description given hereinbelow and the appended drawings which are given byway of illustration only, and thus are not intended as a definition of the limits of the present invention, and wherein:

FIG. 5 is a diagram showing an example of a relation between “user replaceable component option” and “life counter value” of each component;

FIG. 7 is a diagram showing an example of a relation between "user replaceable component option" and "life counter value" of each component;

FIG. 9 is a diagram showing an example of a relation between "user replaceable component option" and "life counter value" of each component;

FIG. 12 is a diagram showing an example of a life counter display screen; and FIG. 13 is a diagram showing an example of a life counter display screen.

DESCRIPTION OF THE PREFERRED EMBODIMENTS

Hereinafter, an embodiment of the present invention will be described in detail with reference to the drawings.

First, a configuration will be described.

Figure 1:
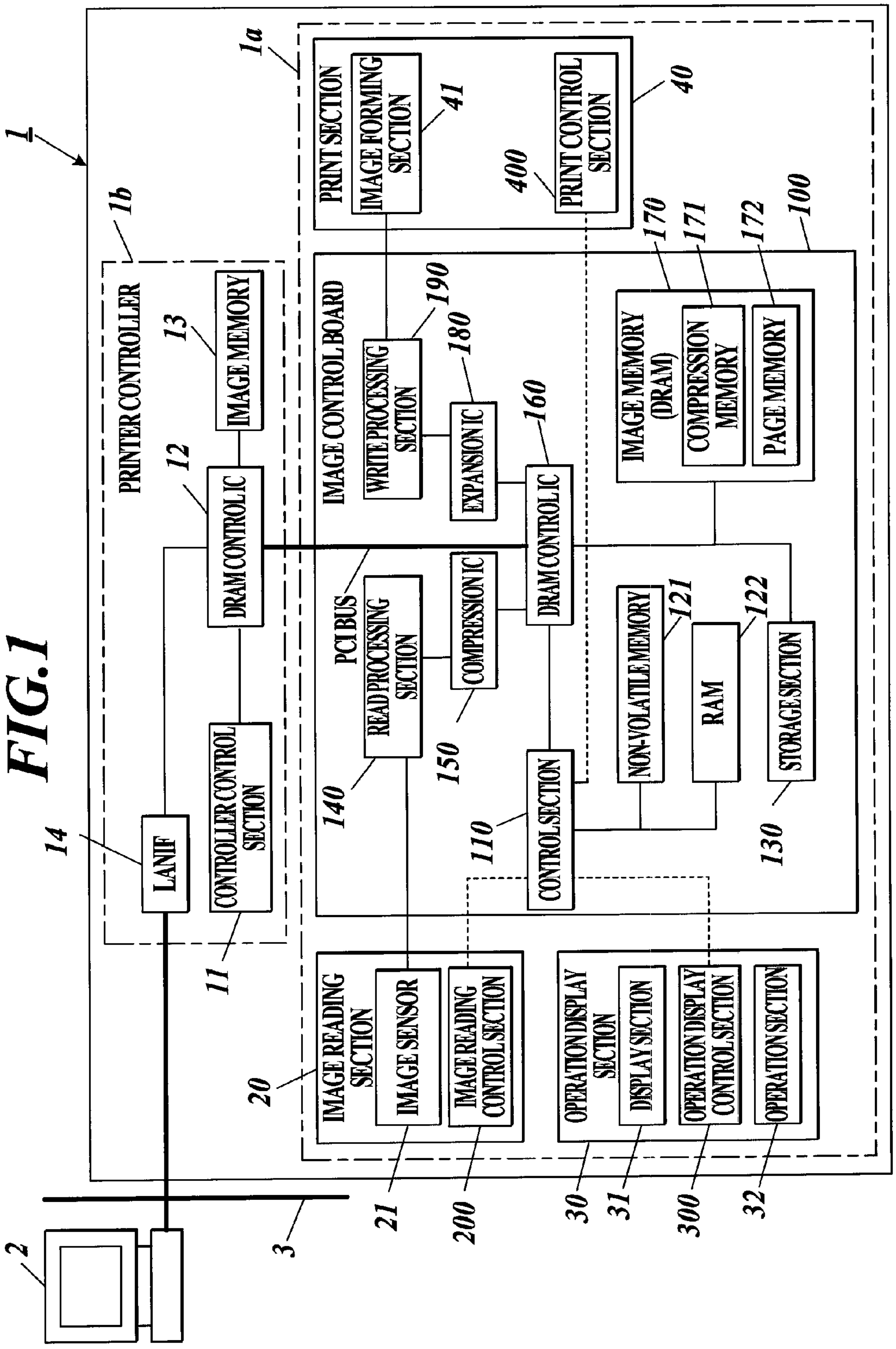
FIG. 1 is a schematic configuration diagram of an image forming apparatus.

In FIG. 1, a schematic configuration diagram of an image forming apparatus 1 of the embodiment is shown.

The image forming apparatus 1 shown in FIG. 1 is a digital multi function printer which reads an image from a document to form the read image on a paper and which receives job data from an external device 2 and the like to form an image on a paper based on the received job data.

As shown in FIG. 1, the image forming apparatus 1 includes a main body 1*a* and a printer controller 1*b*. The image forming apparatus 1 is connected with the external device 2 on a network 3 via LANIF (Local Area Network InterFace) 14 of the printer controller 1*b* so that information can be sent and received between the image forming apparatus 1 and the external device 2.

The main body 1*a* includes an image reading section 20, an operation display unit 30, a print section 40 and an image control board 100.

The image reading section 20 is constituted of an image sensor 21, an image reading control section 200, an automatic document feeding section called ADF (Auto Document Feeder), a reading section and the like. The image reading control section 200 has a scanner function of controlling the automatic document feeding section, the reading section and the like based on an instruction from the control section 110 and reading images of a plurality of documents. The read analog image signals are outputted to the read processing unit 140. Here, images are not limited to image data such as graphics and photographs and includes text data such as letters and symbols, and the like.

The operation display section 30 is constituted of a display section 31, an operation section 32 and an operation display control section 300.

The operation display control section 300 makes the display section 31, which is constituted of LCD (Liquid Crystal Display) or the like, display various types of screens to input various types of setting conditions, various types of processing results and the like according to display signals which are inputted from the control section 110. Further, the operation display control section 300 outputs operation signals which are inputted from the operation section 32 which includes various types of switches, buttons, ten-keys and a group of operation keys or a touch panel.

The print section 40 carries out an image forming process of an electrographic method based on the inputted print data, and the print section 40 includes section according to print output such as a paper feeding section, a paper conveying section, an image forming section 41 for each color, a fixation unit, an exporting section and the like and a printing control section 400.

The print control section 400 controls operation of each section of the print section 40 such as the image forming section 41 according to an instruction from the control section 110, and makes each section of the print section 40 carry out image forming based on the print data inputted from the write processing section 190.

The paper feeding section includes a paper feeding unit constituted of a plurality of paper trays, paper feeding rollers each of which is provided for each paper tray, a separation roller, a paper feeding/separation rubber, an advancing roller and the like. Papers which are identified in advance according to types of paper (paper type, basis weight, paper size and the like) are stored in each of the paper trays according to each type of paper, and the papers are conveyed to the paper conveying section one by one from the top by the paper feeding unit.

The paper conveying section conveys a paper which is conveyed from a paper tray on to the paper conveying path to the image forming section 41, which includes a plurality of intermediate rollers, a resist roller and the like, and conveys the paper to the transferring device of the image forming section.

The image forming section 41 includes a photosensitive drum, a charging device, an exposure device, a developing device, a primary transferring roller, a cleaning device and the like. The image forming section 41 generates an output matter in which an image is formed on the paper based on the print data. When the image forming apparatus 1 is for forming color images, the image forming section 41 is provided for each color.

In the image forming section 41 which forms an image of yellow (Y), light according to image data of yellow (Y) is irradiated to the surface of the photosensitive drum which is charged by the charging device from the exposure device to write an electrostatic latent image. Thereafter, yellow (Y) toner which is charged is attached to the surface of the photosensitive drum in which the electrostatic latent image is written by the developing device to develop the electrostatic latent image. The toner which is attached on the photosensitive drum by the developing device is transferred to the intermediate transfer belt at the primary transfer position where the primary transfer roller is arranged by the photosensitive drum rotating at a constant speed. After the toner is transferred to the intermediate transfer belt, residual charge, residual toner and the like on the surface of the photosensitive drum are removed by the cleaning device, and the removed toner and the like are collected in the toner collecting box.

In similar way, the image forming section 41 of each color includes a charging device, an exposure device, a developing device, a primary transfer roller, a cleaning device and the like which are arranged at periphery of the photosensitive drum, and each of the image forming section 41 forms each of toner images of magenta (M), cyan (C) and black (K).

The toner images of each color which are transferred to the intermediate transfer belt are transferred on to a paper at once at the secondary transfer position where the secondary transfer roller is arranged.

The fixation unit is constituted of a fixation heater, a fixation roller, an external heater for fixation and the like. The fixation unit fixes the toner image which is transferred on to the paper by heating.

The exporting section exports the paper to which the fixation process is carried out on to the paper-discharge tray by nipping the paper by the paper-discharging roller and the like.

The image control board 100 includes a control section 110, a non-volatile memory 121, RAM (Random Access Memory) 122, a storage section 130, a read processing section 140, a compression IC 150, DRAM (Dynamic Random Access Memory) control IC 160, an image memory 170, an expansion IC 180, a write processing section 190 and the like.

The control section 110 is constituted of CPU (Central Processing Unit) and the like. The control section 110 reads a system program which is stored in the non-volatile memory 121 and a designated program among various types of application programs which are stored in the non-volatile memory 121 to expand the programs in the RAM 122. Further, the control section 110 executes various types of processes in cooperation with the programs which are expanded in the RAM 122 to integrally control the section of the image forming apparatus 1.

Moreover, the control section 110 reads out the life counter counting process program, the user replaceable component setting process program and the component state displaying process program according to the embodiment from the non-volatile memory 121 to execute each of the life counter counting process, the user replaceable component setting process and the component state displaying process in cooperation with the respective program and various types of data.

In the life counter counting process, the usage level of each of the components which constitute the image forming apparatus 1 is detected (counted) as a life counter value according to the operation of the image forming apparatus. The life counter value is a ratio (%) of the usage level with respect to the limit of usage which is set in advance for each component.

Further, in the life counter counting process, an over limit notification is outputted when the life counter value exceeded the limit.

In the user replaceable component setting process, a user replaceable component option screen (see FIG. 2) is displayed in the display section 31 according to the operation signal which is inputted from the operation display section 30 by a maintenance worker (hereinafter, called as a serviceman) of the image forming apparatus 1. Further, the person who can replace the replaceable components which constitute the image forming apparatus 1 is set for each of the components according to the operation signal inputted via the user replaceable component option screen, and the settings are stored in the storage section 130.

In the component state displaying process, information of the components which are to be displayed in the display section 31 is displayed differently according to the setting of the replacing person of each component. As for information of the components each of which having a maintenance worker (serviceman) set as the replacing person, the information of the components are displayed in the display section 31 in terms of each component. Further, as for information of the components each of which having a user set as the replacing person, the information of the components are displayed in terms of each unit which includes each of the components as a constituent.

The non-volatile memory 121 stores the life counter counting process program, the user replaceable component setting process program and the component state displaying process program according to the embodiment, data which are processed by various types of programs, and the like in addition to various types of processing programs and various types of data according to image forming.

RAM 122 forms a work area which temporarily stores various types of programs to be executed by the control section 110, various types of data of the programs and the like.

The storage section 130 is a non-volatile storage medium which is readable and writable of HDD (Hard Disk Drive), and the storage section 130 stores a plurality of job data. Further, the storage section 130 stores various types of information which are inputted from an external device 2 and the operation display section 30.

In particular, setting information such as "identification number (No.)", "component name", "including component number", "unit number" and the like for identifying the components are stored in the storage unit 130 in advance for each of the components which constitute the image forming apparatus. In the "including component number", whether the component is a parent component or not is indicated, and further, when the component is a child component, the identification number (No.) of the parent component is set. The parent component is constituted by including a plurality of child components and the plurality of child components form a unit as a group. Each component is a part of the unit component and is included in the unit component.

For example, the fixation unit is a parent component. The fixation unit includes child components such as the fixation heater, the fixation roller and the external heater for fixation.

Moreover, life counter values of the components which are obtained by executing the life counter counting process, information of the replacing person for each of the components obtained by executing the user replaceable component setting process are stored in the storage section 130. Here, as for the life counter value of the parent component, the highest value among the life counter values of the child components is shown.

The read processing section 140 carries out various types of processes such as analog process, A/D conversion process, shading process and the like to the analog image signal which is inputted from the image reading section 20. Thereafter, the read processing section 140 generates digital image data. The generated image data is outputted to the compression IC 150.

The compression IC 150 carries out compression process to the inputted digital image data and outputs the compressed digital image data to the DRAM control IC 160.

The DRAM control IC 160 controls the compression process of the image data by the compression IC 150 and the expansion process of the compressed image data by the expansion IC 180 in compliance with the instruction from the control section 110, and also, carries out input/output control of the image data to and from the image memory 170.

For example, when the instruction to store the image signal which is read by the image reading section 20 is inputted from the control section 110, the DRAM control IC makes the compression IC 150 carry out the compression process of the image data which is inputted to the read processing section 140 and makes the compression memory 171 of the image memory 170 store the compressed image data. Further, when the instruction to print output the compressed image data which is stored in the compression memory 171 is inputted from the control section 110, the DRAM control IC reads out the compressed image data from the compression memory 171 and makes the expansion IC 180 carry out the expansion process to the compressed image data and stores the image data which is expanded in the page memory 172. Further, when the instruction to print output the image data which is stored in the page memory 172 is inputted, the DRAM control IC reads out the image data from the page memory 172 and outputs the read image data to the writ processing section 190.

The image memory 170 includes the compression memory 172 and the page memory 172 which are constituted of DRAM (Dynamic RAM). The compression memory 171 is a memory for storing compressed image data and the page memory 172 is a memory for temporarily storing image data (print data) for print output.

The expansion IC 180 carries out the expansion process to the compressed image data.

The write processing section 190 generates print data for image forming based on the image data inputted from the DRAM control IC 160 and outputs the generated print data to the print section 40.

Next, each section of the printer controller 1*b* will be described. The printer controller 1*b* carries out management and control of data which is to be input to the image forming apparatus 1 from the external device 2 which is connected to the network 3 when the image forming apparatus 1 is used as a network printer. Further, the printer controller 1*b* receives data which is targeted for printing from the external device 2 and transmits the data to the main body 1*a* as job data.

The printer controller 1*b* is constituted of a controller control section 11, a DRAM control IC 12, an image memory 13 and a LAN IF 14.

The controller control section 11 integrally controls operation of each section of the printer controller 1*b* and transmits data which is inputted from the external device 2 to the main body 1*a* as job data via the LAN IF 14.

The DRAM control IC 12 controls storing of the data which is received by the LAN IF 14 in the image memory 13 and reading out of the data from the image memory 13. Further, the DRAM control IC 12 is connected with the DRAM control IC 160 of the image control board 100 by a PCI (Peripheral Components Interconnect) bus and reads the data which is targeted for printing from the image memory 13 and outputs the read data to the DRAM control IC 160 in compliance with the instruction from the controller control section 11.

The image memory 13 is constituted of DRAM and temporarily stores the inputted data.

The LAN IF 14 is a communication interface for connecting to the network 3, such as LAN which is NIC (Network Interface Card), a modem or the like, and the LAN IF 14 receives data from the external device 2. The received data is outputted to the DRAM control IC 12.

Next, the operation according to the embodiment will be described.

First, the user replaceable component setting process will be described by using FIG. 2.

Figure 2:
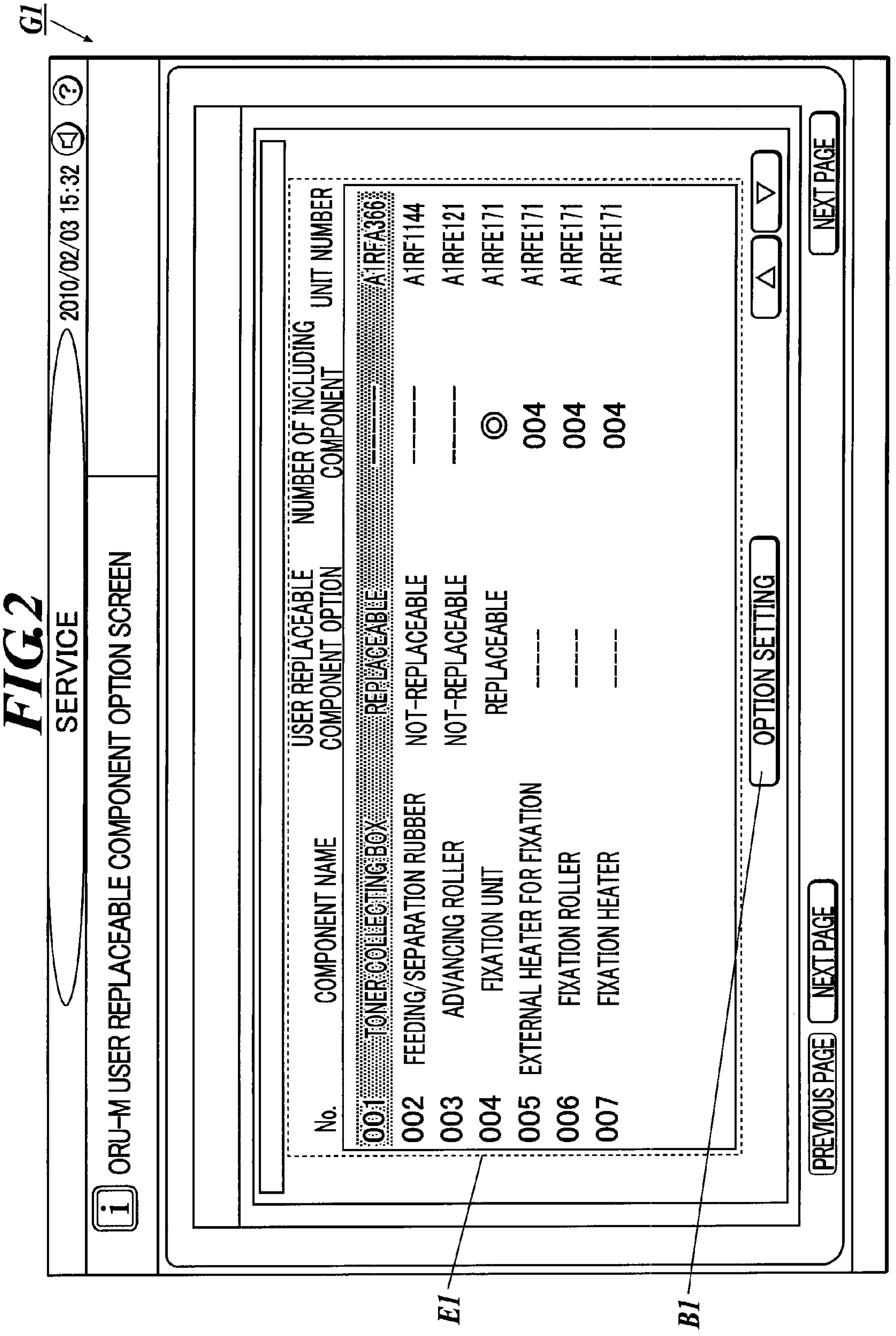
FIG. 2 is a diagram showing an example of a user replaceable component option screen.

In FIG. 2, an example of a user replaceable component selecting screen G1 is shown.

As shown in FIG. 2, an option display region E1 in which information of each component corresponding to the items of "No." which indicates the identification number of the component, "component name", "user replaceable component option", "including component number" and "unit number" are displayed in a list form and an option setting button B1 are provided in the user replaceable component option screen G1. The information of each component corresponding to the items of "No.", "component name", "including component number" and "unit number" are information stored the storage section 130.

In the item of "user replaceable component option", either one of "replaceable", "not-replaceable" and "-" is shown.

"Replaceable" indicates that the component is replaceable by a user, that is, indicates that the replacing person in a user. "Not-replaceable" indicates that the component is not replaceable by a user, that is, indicates that the replacing person is a serviceman.

Here, "-" is set in advance for the components which are child components and indicates so as to comply with the setting of their parent component for the item "user replaceable component option". For example, as for the component (child component) in which "-" is shown for the item "user replaceable component option", the component (child component) is to be "replaceable" when its parent component is "replaceable" and is to be "not-replaceable" when its parent component is "not-replaceable".

In the user replaceable component option screen G1 shown in FIG. 2, for example, when the option setting button B1 is pushed in a state where the component in which "0001" is shown for the item "No." in the option display region E1, the indication of the item "user replaceable component option" switches between "replaceable" and "not-replaceable" every time the option setting button B1 is pushed.

In such way, according to the operation signal of pushing of the option setting button B1 in the user replaceable component option screen G1, the replacing person of each component is set.

The information regarding the replacing person of each component which is set in the user replaceable component option screen G1 shown in FIG. 2 is stored in the storage section 130.

Figure 3:
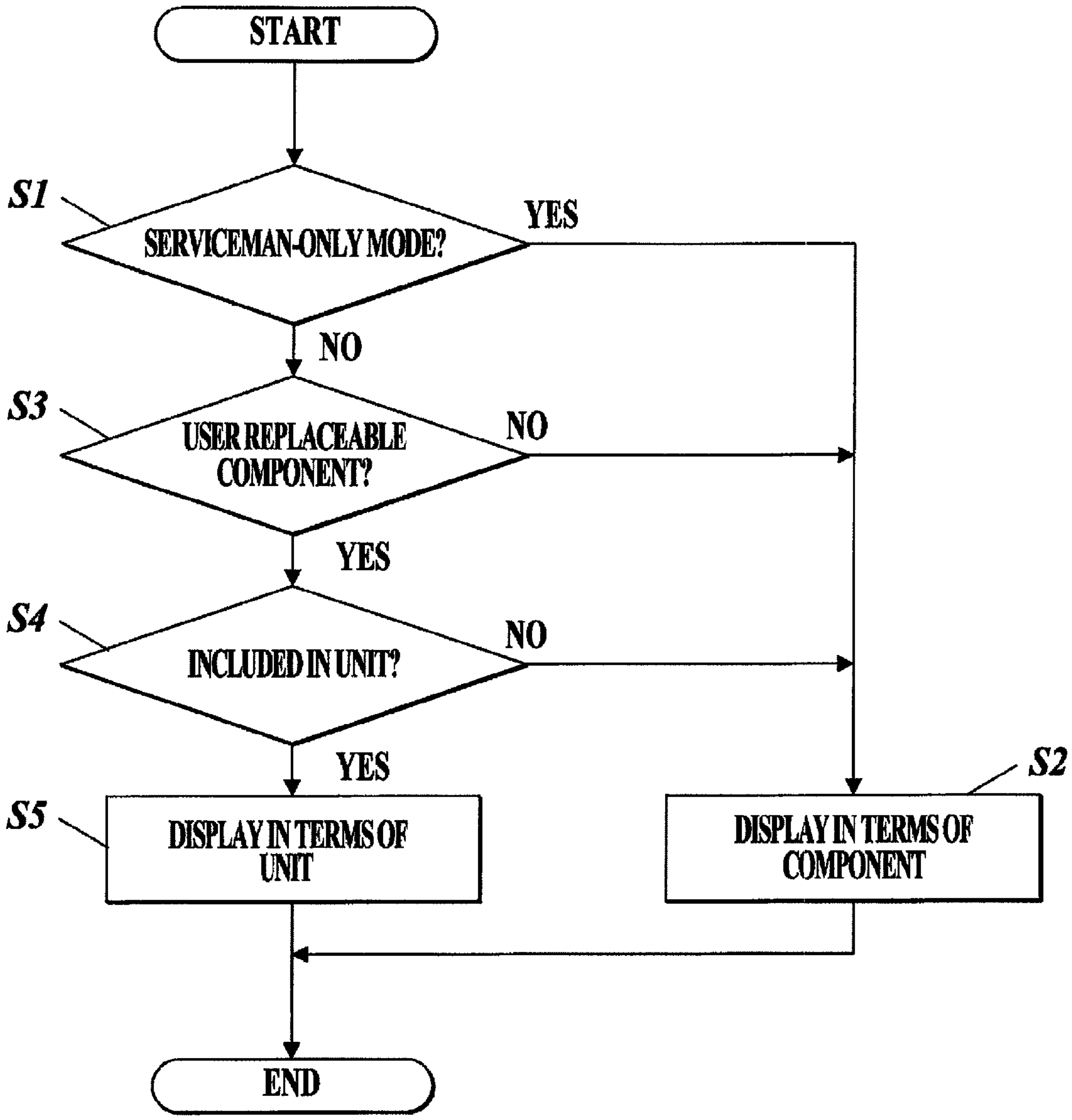
FIG. 3 is a flowchart for a component state display process.

In FIG. 3, a flowchart of the component state displaying process according to the embodiment is shown.

The flowchart shown in FIG. 3 is a process which is executed by the control section 110 cooperating with each section. By using FIGS. 3 to 11, the component state displaying process which is executed when displaying information of component, wherein the information for informing the replacement of the component in which the over limit notification is outputted is displayed as the information of the component.

When the over limit notification is outputted by the execution of the life counter counting process, the control section 110 determines whether the operation mode of the image forming apparatus is a serviceman-only mode or not (step S1). The serviceman-only mode is an operation mode in which the replacement of a component is to be carried out after confirmation by the serviceman is carried out according to the operation signal which is inputted from the operation display section 30, for example.

When the operation mode is the serviceman-only mode (step S1; YES), the control section 110 makes the operation display section 30 display the information of informing the replacement of the component which reached the over limit as information in terms of each component (step S2), and the control section 110 finishes the component state displaying process.

Figure 4:
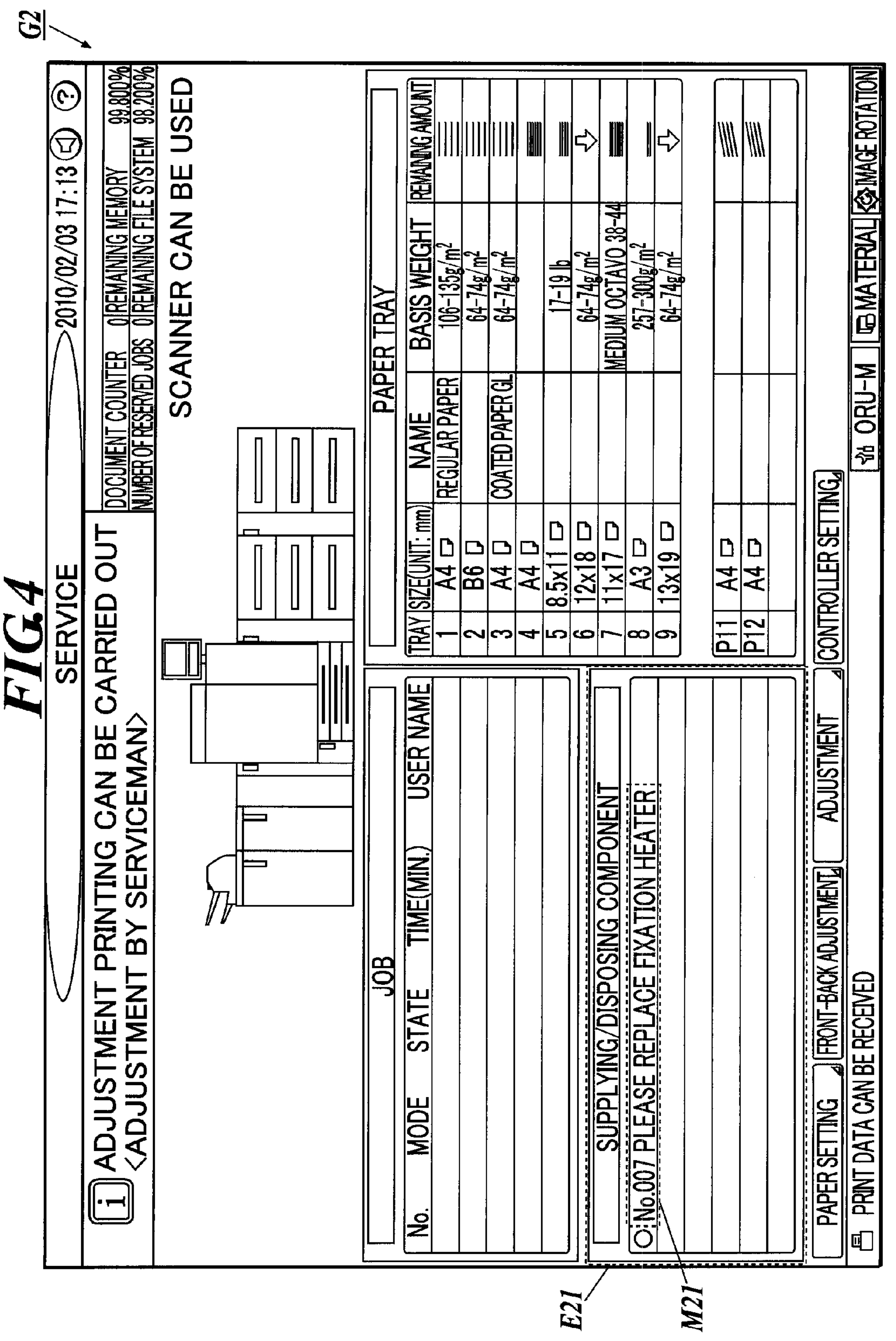
FIG. 4 is a diagram showing an example of a mode display screen which is to be displayed when the operation mode is a serviceman-only mode.

In FIG. 4, an example of a mode display screen which is to be displayed in step S2 when the operation mode is the serviceman-only mode (step S1; YES) is shown.

In FIG. 5, an example of a relation between the "user replaceable component operation" of each component which is set in the user replaceable component setting process and the "life counter value" of each component which is counted by the life counter counting process, when the mode display screen shown in FIG. 4 is displayed, is shown.

In FIG. 5, the item "life counter value" of the "fixation heater" in which "No." is "007" is 150% exceeding 100% (limit). In such case, the over limit notification for the "fixation heater" is outputted. Further, "-" is shown for the item "user replaceable component option" and "004" is shown of the item "including component number" for the "fixation heater" as shown in FIG. 5, therefore, the "fixation heater" is a child component of the "fixation unit" which is indicated in the item "including component number" and the "fixation heater" is a component which is to comply with the setting in the "fixation unit" for the item "user replaceable component option".

In the mode display screen G2 shown in FIG. 4, a supplying/disposing component display column E21 is provided. In the supplying/disposing component display column E21, information of a component which needs to be replaced to be supplied or to be disposed is displayed.

When the operation mode is the serviceman-only mode, information for informing replacement of a component ("fixation heater") is displayed as a message M21 in the supplying/disposing component display column E21 in terms of each component in which the over limit notification is outputted, the message being such as "No. 007 Please replace fixing heater" or the like in the mode display screen G2 which is to be shown in step S2.

When the operation mode is not the serviceman-only mode (step S1; NO), the control section 110 determines whether the component in which the over limit notification is outputted is a component which is replaceable by a user or not (step S3).

In step S3, for example, when "replaceable" is set for the item "user replaceable component option", the component is determined to be replaceable by a user, and when "not-replaceable" is set, the component is determined to be not replaceable by a user. Here, when "-" is set, information of the item "user replaceable component option" of its parent component which is indicated in the item "including component number" is referred to for the determination.

When the component is not replaceable by a user, that is, when the replacing person for the component is a serviceman (step S3; NO), the control section 110 proceeds to the process of step S2.

Figure 6:
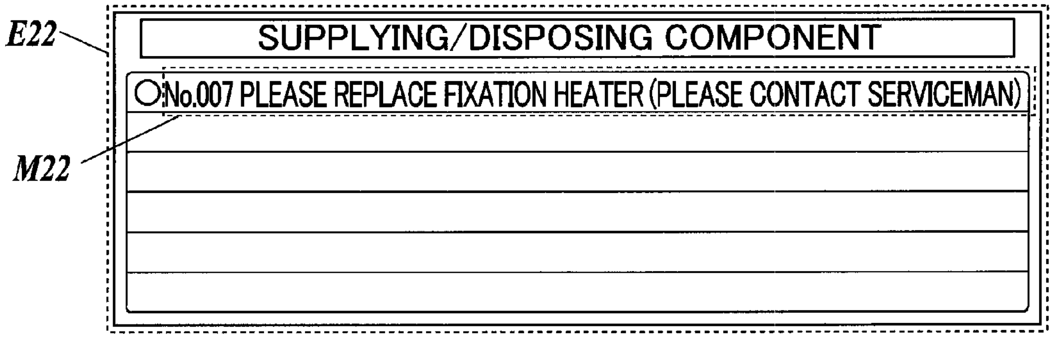
FIG. 6 is a diagram showing an example of a supplying/disposing component display column in the mode display screen which is to be displayed when the operation mode is not the serviceman-only mode and when the component is not replaceable by a user.

In FIG. 6, an example of the supplying/disposing component display column in the mode display screen which is to be displayed in step S2 when the operation mode is not the serviceman-only mode (step S1; NO) and the component is not replaceable by a user (step S3; NO).

In FIG. 7, an example of a relation between the "user replaceable component option" of each component which is set in the user replaceable component setting process and the "life counter value" of each component which is counted by the life counter counting process, when the supplying/disposing component display column shown in FIG. 6 is displayed, is shown.

In FIG. 7, the "life counter value" of the "fixation heater" in which "No." is "007" is 150% exceeding 100% (limit). In such case, the over limit notification for the "fixation heater" is outputted. Further, as shown in FIG. 7, "-" is shown for the item "user replaceable component option" and "004" is shown for the item "including component number" for the "fixation heater", therefore, the "fixation heater" is a child component of the "fixation unit" which is indicated in the item "including component number" and the "fixation heater" is a component which complies with the setting in the "fixation unit" for the item "user replaceable component option". In FIG. 7, "not-replaceable" is shown in the item "user replaceable component option" of the "fixation unit" which is the parent component of the "fixation heater", therefore, the "fixation heater" is not replaceable by a user and the replacing person for the "fixation heater" is a serviceman.

In the supplying/disposing component display column E22 shown in FIG. 6, information for informing replacement of a component ("fixation heater") in terms of each component in which the over limit notification is outputted and information urging to notify a serviceman are displayed as a message M22, the message being "No. 007 Please replace fixation heater (please notify serviceman)" or the like, for example.

When the component is replaceable by a user, that is, when the replacing person for the component is a user (step S3; YES), the control section 110 determines whether the component in which the over limit notification is outputted is a component (child component) included in a unit (parent component) or not (step S4).

In step S4, for example, the component in which the over limit notification is outputted is determined as being included in a unit when the identification number (No.) which indicates the parent component is set for the item "including component number" of the component in which the over limit notification is outputted.

When the component in which the over limit notification is outputted is not included in a unit (parent component) (step S4; NO), the process proceeds to the processing of step S2.

Figure 8:
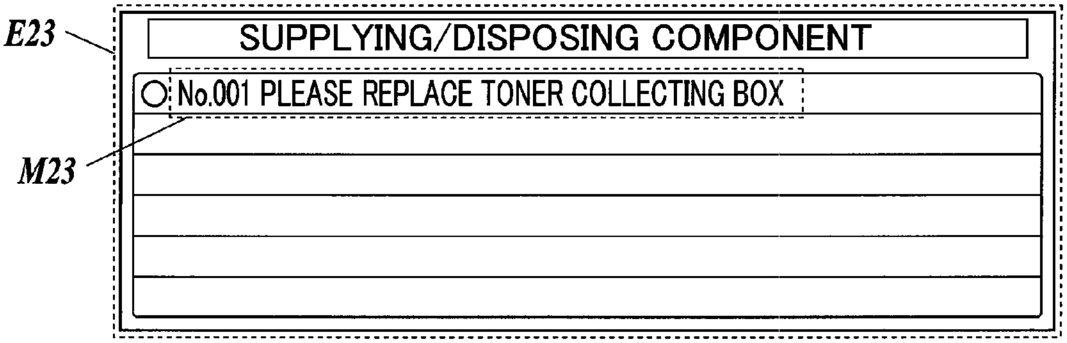
FIG. 8 is a diagram showing an example of a supplying/displaying component display column in the mode display screen which is to be displayed when the operation mode is not the serviceman-only mode, the component is replaceable by a user and the component is not included in a unit.

In FIG. 8, an example of the supplying/disposing component display column in the mode display screen which is to be displayed in step S2 when the operation mode is not the serviceman-only mode (step S1; NO), the component is replaceable by a user (step S3; YES) and the component is not included in a unit (step S4; NO) is shown.

In FIG. 9, an example of a relation between the "user replaceable component option" of each component which is set in the user replaceable component setting process and the "life counter value" of each component which is counted by the life counter counting process, when the supplying/disposing component display column shown in FIG. 8 is displayed, is shown.

In FIG. 9, the "life counter value" of the "toner collecting box" in which "No." is "001" is 120% exceeding 100% (limit). In such case, the over limit notification for the "toner collection box" is outputted.

Moreover, as shown in FIG. 9, "replaceable" is set for the item "user replaceable component option" and "-" is set for the item "including component number" for the "toner collecting box", therefore, the "toner collection box" is a component which is replaceable by a user and is a component which is not included in a unit.

In the supplying/disposing component column E23 shown in FIG. 8, information for informing replacement of a component ("toner collecting box") is displayed in terms of each component in which the over limit notification is outputted as a message M23, the message being "No. 001 Please replace toner collecting box" or the like, for example.

When the component in which the over limit notification is outputted is included in a unit (parent component) (step S4; YES), the control section 110 makes the operation display section 30 display the information for informing replacement of the component which exceeded the limit in terms of each unit (step S5), and the control section 110 finishes the component state display processing.

Figure 10:
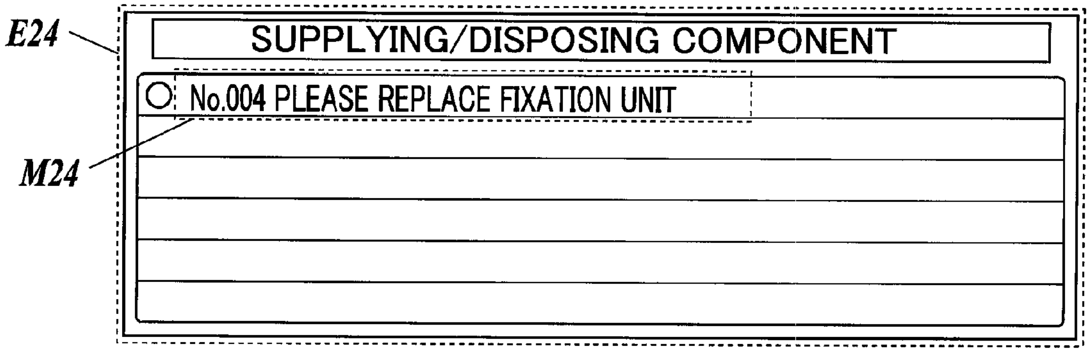
FIG. 10 is a diagram showing an example of a supplying/disposing component display column in the mode display screen which is to be displayed when the operation mode is not the serviceman-only mode, the component is replaceable by a user and the component is included in a unit.

In FIG. 10, an example of the supplying/disposing component display column in the mode display screen which is to be displayed in step S5 when the operation mode is not the serviceman-only mode (step S1; NO), the component is replaceable by a user (step S3; YES) and the component is included in a unit (step S4; YES) is shown. Here, FIG. 4 is referred to for an example of a relation between the "user replaceable component option" of each component which is set in the user replaceable component setting process and the "life counter value" of each component which is counted by the life counter counting process when the supplying/disposing component display column shown in FIG. 10 is displayed.

In the supplying/disposing component display column E24 shown in FIG. 10, information for informing replacement of the component "fixation heater" is displayed in terms of each unit (here, "fixation unit") which includes the component "fixation heater" in which the over limit notification is outputted as a message M24, the message being "No. 004 Please replace fixation unit" or the like, for example.

In FIG. 10, the information for informing the replacement in terms of each unit (parent component) including the component is displayed as the message M24. However, the message is not limited to this. For example, a message M25 shown in FIG. 11 may be displayed in the supplying/disposing component display column E24 instead of the message M24 shown in FIG. 10.

Figure 11:
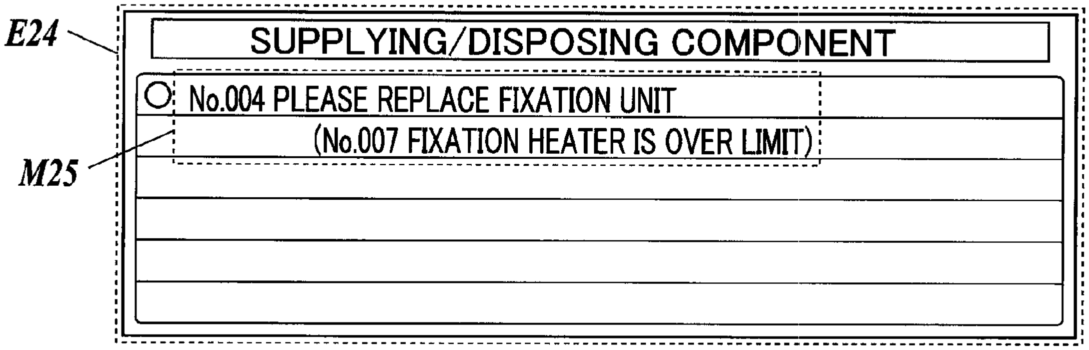
FIG. 11 is a diagram showing another example of a supplying/disposing component display column in the mode display screen which is to be displayed when the operation mode is not the serviceman-only mode, the component is replaceable by a user and the component is included in a unit.

As shown in FIG. 11, the message M25 displays the information for informing the replacement of the component "fixation heater" in terms of each unit (here, "fixation unit") which includes the component "fixation heater" in which the over limit notification is outputted and the information for informing that the component "fixation heater" reached the limit and needs to be replaced in terms of component "fixation heater", the message being "No. 004 Please replace fixation unit (No. 007 Fixation heater is over limit)" or the like, for example.

[Modification]

In the above embodiment, the information of the component is the information for informing replacing of the component in which the over limit notification is outputted, and the component state displaying process which is executed when the information of the component is to be displayed is described. However, the information of the component is not limited to this. For example, the information of the component may be the usage level (life counter value) of the component, and the component state displaying process may be executed when this information is to be displayed.

Hereinafter, the component state displaying process which is executed when the information of the component is to be displayed wherein the information being the usage level of the component will be described by using FIGS. 3, 12 and 13.

When the display instruction of a life counter value is inputted by the operation display section 30, the control section 110 determines whether the operation mode of the image forming apparatus is the serviceman-only mode or not (step S1).

When the operation mode is the serviceman-only mode (step S1; YES), the control section 110 makes the operation display section 30 display the information of the component in which the life counter value is to be displayed in terms of each component (step S2), and the control section 110 finishes the component state displaying process.

When the operation mode is not the serviceman-only mode (step S1; NO), the control section 110 determines whether the component in which the life counter value is to be displayed is the component which is replaceable by a user or not (step S3). When the component is not replaceable by a user (step S3; NO), the control section 110 proceeds the procedure to the process of step S2.

When the component is replaceable by a user (step S3; YES), the control section 110 determines whether the component in which the life counter value is to be displayed is a child component included in a user (parent component) or not (step S4). When the component in which the life counter value is to be displayed is not included in a unit (parent component) (step S4; NO), the procedure proceeds to the process of step S2.

When the component in which the life counter value is to be displayed is included in a unit (parent component) (step S4; YES), the control section 110 makes the operation display section 30 display the information of the component in which the life counter value is to be displayed as information in terms of each unit (step S5), and the component state displaying process is finished.

Here, when there are a plurality of components which are instructed to display the life counter values thereof, the above described component state displaying process is executed for each component which is specified.

In FIG. 12, an example of the life counter display screen G10 which is to be displayed in step S2 is shown.

Here, as for an example of a relation between the "user replaceable component option" of each component which is set in the user replaceable component setting process and the "life counter value" of each component which is counter by the life counter counting process when the life counter display screen shown in FIG. 12 is to be displayed, FIG. 7 is referred to.

Moreover, here, it is assumed that the components which have "No." of "001" to "007" ("toner collecting box", "feeding/separation rubber", "advancing roller", "fixation unit", "external heater for fixation", "fixation roller" and "fixation heater") are instructed to display their life counter values.

As shown in FIG. 7, the item "user replaceable component option" of the "toner collection box" is set to "replaceable", therefore, the "toner collecting box" is a component which is replaceable by a user. However, because the item "including component number" is set to "-", the "toner collecting box" is not a child component which is included in a unit.

Further, the item "user replaceable component option" of the "feeding/separation rubber" and "advancing roller" are set to "not-replaceable", therefore, the "feeding/separation rubber" and the "advancing roller" are not components which are replaceable by a user.

Furthermore, the "external heater for fixation", "fixation roller" and "fixation heater" are child components which are included in the "fixation unit", and because the item "user replaceable component option" of the fixation unit is set to "not-replaceable", the above child components are not the components which are replaceable by a user.

As shown in FIG. 12, in the life counter display screen G10, information of each component with regards to the items of "No.", "component name" and "life counter value" are displayed in a list form in terms of each component.

In particular, for each of "toner collecting box", "feeding/separation rubber", "advancing roller", "fixation unit" and "external heater for fixation", "fixation roller" and "fixation heater" which are child components of the "fixation unit" shown in FIG. 12, the life counter values thereof are displayed in terms of each component.

Here, the highest life counter value among the life counter values of the child components is displayed as the life counter value of the parent component. For example, as shown in FIG. 12, the life counter value of "fixation heater" which is "150" is shown for the life counter value of the "fixation unit", wherein the life counter value of the fixation heater" which is "150" is the highest life counter value among the "external heater for fixation", "fixation roller" and "fixation heater".

In FIG. 13, an example of the life counter display screen G20 which is to be displayed in step S5 is shown.

Here, as for an example of a relation between the "user replaceable component option" of each component which is set in the user replaceable component setting process and the "life counter value" of each component which is counter by the life counter counting processing when the life counter display screen shown in FIG. 13 is displayed, FIG. 5 is referred to.

Moreover, here, it is assumed that the components which have "No." of "001" to "007" ("toner collecting box", "feeding/separation rubber", "advancing roller", "fixation unit", "external heater for fixation", "fixation roller" and "fixation heater") are instructed to display their life counter values.

As shown in FIG. 5, the item "user replaceable component option" of the "toner collecting box" is set to "replaceable", therefore, the "toner collecting box" is a component which is replaceable by a user. However, because the item "including component number" of the "toner collecting box" is set to "-", the "toner collecting box" is not a child component which is included in a unit.

Further, the item "user replaceable component option" of the "feeding/separation rubber" and the "advancing roller" are set to "not-replaceable", therefore, the "feeding/separation rubber" and the "advancing roller" are not the components which are replaceable by a user.

Moreover, the "external heater for fixation", "fixation roller" and "fixation heater" are child components included in the "fixation unit", and because the item "user replaceable component option" of the fixation unit is set to "replaceable", the above child components are components which are replaceable by a user.

As shown in FIG. 13, in the life counter display screen G20, information of each component with regards to the items of "No.", "component name" and "life counter value" are displayed in a list form in terms of each component.

In particular, for the "toner collecting box", "feeding/separation rubber" and "advancing roller" shown in FIG. 13, the life counter values thereof are displayed in terms of each component. On the other hand, the life counter values of the child components of the "fixation unit" ("external heater for fixation", "fixation roller" and "fixation heater") are not displayed and the life counter value of the parent component ("fixation unit") is displayed.

As described above, according to the embodiment, information of each component is displayed differently according to the setting of the replacing person of each component. Therefore, information of components can be easily recognized according to the replacing person of the components.

Especially, information of the components in which the replacing person is a user and information of the components in which the replacing person is a maintenance worker (serviceman) can be displayed differently. Therefore, the information of the components can be displayed in terms of information appropriate for a user and for a serviceman. Further, a user and the serviceman can be easily determine the state of the components.

Moreover, the information of the components in which the replacing person is a serviceman can be displayed as information in terms of each component. Therefore, the serviceman who has the specialized skills for replacement operation can easily recognize the component which needs to be replaced.

Generally, a user carries out the replacement operation in units which is easy and safe because a user does not have the specialized skills for replacing operation. Therefore, in the embodiment, the information of the components in which the replacing person is a user can be displayed as information in terms of each unit that includes each of the components. Thus, a user can easily recognize the unit which needs to be replaced.

Here, by displaying the information of the components in which the replacing person is a serviceman as information in terms of each component and as information in terms of each unit which includes each of the components, the unit which needs to be replaced can be easily recognized and the components which are included in the unit can also be recognized.

Further, when the operation mode is the serviceman-only mode, the person who carries out the maintenance operation of the image forming apparatus is limited to a serviceman who has the specialized skills. Therefore, when the operation mode is the serviceman-only mode, the serviceman can easily recognize the component which needs to be replaced by the information of components being displayed as information in terms of each component.

Furthermore, according to the embodiment, the information (over limit notification) which informs replacing of components in which the usage levels exceed the limit can be displayed differently according to the setting of the replacing person (user/serviceman) of each component. Therefore, the replacement operation of the replaceable components can be carried out according to the replacing person at appropriate timings.

Moreover, as shown in the modification, information indicating the usage level (life counter values) of components can be displayed differently according to the setting of the replacing person (user/serviceman) of each component.

In the above description, an example where the non-volatile memory 121 is used as a computer readable medium of the programs of the present invention is described. However, the present invention is not limited to this.

As other computer readable mediums, non-volatile memories such as a flash memory and the like and portable storage mediums such as CD-ROM and the like can be applied.

Further, a carrier wave may be applied to the present invention as a medium which provides data of programs of the present invention via a communication circuit.

Moreover, the present invention is not limited to the above described embodiment, and can be arbitrarily modified within the scope of the present invention.

According to one aspect of the preferred embodiment of the present invention, there is provided an image forming apparatus including a plurality of components, a display section to display information of the components, a storage section to store replacing person information of the components and a control section to make the information of the components which are displayed in the display section be different according to the replacing person information of the components.

According to one aspect of the preferred embodiment of the present invention, there is provided a display method for an image forming apparatus comprising a plurality of components and a display section to display information of the components including making the information of the components which are displayed in the display section be differnt according to replacing person information of the components stored in a storage section.

In the image forming apparatus and the display method, the information of the components which are to be displayed in the display section can be different according to the replacing person information of the components. Therefore, the information of the components can be easily recognized according to the replacing person of the components.

Preferably, the storage section stores information showing whether a user who uses the image forming apparatus is a replacing person of the components or whether a maintenance worker who carries out a maintenance management of the image forming apparatus is the replacing person of the components, and the control section makes information of components in which the replacing person is the user and information of components in which the replacing person is the maintenance worker which are displayed in the display section be different.

Moreover, according to the present invention, the information of the components in which the replacing person is the user and the information of the components in which the replacing person is the maintenance worker which are to be displayed in the display section can be different.

Preferably, the control section displays the information of the components in which the replacing person is the maintenance worker in terms of each component.

Moreover, according to the present invention, the information of the components in which the replacing person is the maintenance worker can be displayed in terms of each component.

Preferably, the control section displays the information of the components in which the replacing person is the user in terms of each unit which includes each of the components.

Moreover, according to the present invention, the information of the components in which the replacing person is the user can be displayed in terms of each unit which includes each of the components.

Preferably, the control section displays the information of the components in which the replacing person is the user in terms of each component and in terms of each unit which includes each of the components.

Moreover, according to the present invention, the information of the components in which the replacing person is the user can be displayed in terms of each component and in terms of each unit which includes each of the components.

Preferably, the image forming apparatus further includes an input section to input a setting of an operation mode exclusive for the maintenance worker, and the control section displays the information of the components in terms of each component when the setting of the operation mode exclusive for the maintenance worker is input from the input section.

Moreover, according to the present invention, the information of the components can be displayed in terms of each component when the setting of the operation mode exclusive for the maintenance worker is inputted.

Preferably, the control section detects a usage level in terms of each component, determines whether the usage level exceeded a limit which is set in advance for each component, and displays information for informing a replacement of a component in which the usage level exceeded the limit as the information of the component.

Moreover, according to the present invention, the information for informing the replacement of the component in which the usage level exceeded the limit can be displayed in the display section as the information of the component.

Preferably, the control section detects a usage level in terms of each component and displays information showing the usage level of the component in the display section as the information of the component.

Moreover, according to the present invention, the information showing the usage level of the component can be displayed in the display section as the information of the component.

According to one aspect of the preferred embodiment of the present invention, there is provided an image forming apparatus including a plurality of components, a display section to display information of the components, a storage section to store replacing person information of the components and information of units which includes the components and a control section to make the information of the components which are displayed in the display section be different according to the replacing person information of the components and the information of the units which includes the components.

Preferably, the storage section stores information showing whether a user who uses the image forming apparatus is a replacing person of the components or whether a maintenance worker who carries out a maintenance management of the image forming apparatus is the replacing person of the components.

The present U.S. patent application claims a priority under the Paris Convention of Japanese paten application No. 2010-086625 filed on Apr. 5, 2010, which shall be a basis of correction of an incorrect translation.

What is claimed is:

1. An image forming apparatus comprising:

a plurality of components;

a display section to display information of the components;

a storage section to store, for each of the components, information indicating whether a replacing person who replaces the component is a user who uses the image forming apparatus or a maintenance worker who carries out a maintenance management of the image forming apparatus; and a control section to control the display section to display the information of the components for which the replacing person is the maintenance worker in terms of each component, and to display the information of the components for which the replacing person is the user in terms of unit when the components are included in units and in terms of each component when the components are not included in the units.

2. The image forming apparatus of claim 1, further comprising an input section to input a setting of an operation mode exclusive for the maintenance worker, wherein the control section controls the display section to display the information of the components in terms of each component when the setting of the operation mode exclusive for the maintenance worker is input from the input section.

3. The image forming apparatus of claim 1, wherein the control section detects a usage level in terms of each component, determines whether the usage level exceeds a limit which is set in advance for each component, and controls the display section to display information indicating a need to replace a component for which the usage level exceeds the limit as the information of the component.

4. The image forming apparatus of claim 1, wherein the control section detects a usage level in terms of each component and controls the display section to display information indicating the usage level of the components as the information of the components.

5. A display method for an image forming apparatus, the image forming apparatus comprising (i) a plurality of components, (ii) a display section to display information of the components, and (iii) a storage section to store, for each of the components, information indicating whether a replacing person who replaces the component is a user who uses the image forming apparatus or a maintenance worker who carries out a maintenance management of the image forming apparatus, and the method comprising:

displaying on the display section (i) the information of the components for which the replacing person is the maintenance worker in terms of each component, and (ii) the information of the components for which the replacing person is the user in terms of unit when the components are included in units and in terms of each component when the components are not included in the units.

6. The display method of claim 5, further comprising:

inputting a setting of an operation mode exclusive for the maintenance worker;

wherein in the displaying, the information of the components is displayed on the display section in terms of each component when the setting of the operation mode exclusive for the maintenance worker is input by the inputting.

7. The display method of claim 5, further comprising:

detecting a usage level in terms of each component;

determining whether the usage level exceeds a limit which is set in advance for each component; and displaying, on the display section, information indicating a need to replace a component for which the usage level exceeds the limit as the information of the component.

8. The display method of claim 5, further comprising:

detecting a usage level in terms of each component; and displaying, on the display section, information indicating the usage level of the components as the information of the components.

9. An image forming apparatus comprising:

a plurality of components;

a display section to display information of the components;

a storage section to store, for each of the components, (i) information indicating whether a replacing person who replaces the component is a user who uses the image forming apparatus or a maintenance worker who carries out a maintenance management of the image forming apparatus, and (ii) information indicating whether the component is included in a unit; and a control section to control the display section to display the information of the components;

wherein, when the replacing person is the maintenance worker, the control section controls the display section to display the information of the components in terms of each component; and wherein, when the replacing person is the user, the control section controls the display section to display the information of the components in terms of unit for those components which are included in a unit and in terms of each component for those components which are not included in a unit.

10. The image forming apparatus of claim 9, further comprising an input section to input a setting of an operation mode exclusive for the maintenance worker, wherein the control section controls the display section to display the information of the components in terms of each component when the setting of the operation mode exclusive for the maintenance worker is input from the input section.

11. The image forming apparatus of claim 9, wherein the control section detects a usage level in terms of each component, determines whether the usage level exceeds a limit which is set in advance for each component, and controls the display section to display information indicating a need to replace a component for which the usage level exceeds the limit as the information of the component.

12. The image forming apparatus of claim 9, wherein the control section detects a usage level in terms of each component and controls the display section to display information indicating the usage level of the components as the information of the components.

* * * * *